United States Patent
Bichler et al.

(10) Patent No.: US 9,248,801 B2
(45) Date of Patent: Feb. 2, 2016

(54) COVER ELEMENT COMPOSED OF PLASTIC FOR A DRIVER'S AIRBAG MODULE AND COVER CONSISTING OF SUCH A COVER ELEMENT AND A CASING ARRANGED ON THE LATTER

(71) Applicant: Autoliv Develpement AB, Vargarda (SE)

(72) Inventors: Rainer Bichler, München (DE); Nico Wallat, München (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 19 days.

(21) Appl. No.: 14/368,141

(22) PCT Filed: Nov. 5, 2012

(86) PCT No.: PCT/EP2012/004604
§ 371 (c)(1),
(2) Date: Jun. 23, 2014

(87) PCT Pub. No.: WO2013/091752
PCT Pub. Date: Jun. 27, 2013

(65) Prior Publication Data
US 2014/0375031 A1    Dec. 25, 2014

(30) Foreign Application Priority Data
Dec. 24, 2011   (DE) .......................... 10 2011 122 465

(51) Int. Cl.
*B60R 21/215*   (2011.01)
*B60R 21/2165*  (2011.01)
*B60R 21/203*   (2006.01)

(52) U.S. Cl.
CPC .............. *B60R 21/215* (2013.01); *B60R 21/203* (2013.01); *B60R 21/21656* (2013.01); *B60R 21/2035* (2013.01); *B60R 2021/21506* (2013.01)

(58) Field of Classification Search
CPC ................ B60R 21/215; B60R 21/203; B60R 21/21656; B60R 21/2035; B60R 2021/21506
USPC ....................................................... 280/728.3
See application file for complete search history.

(56) References Cited

U.S. PATENT DOCUMENTS 5,342,086 A * 8/1994 Harris ............... B60R 21/21656
                                                            280/728.3
5,893,581 A * 4/1999 Niederman ....... B60R 21/21656
                                                            280/728.3

(Continued)

FOREIGN PATENT DOCUMENTS

| DE | 197 30 340 A1 | 1/1998 |
| DE | 10 2009 030 151 B3 | 12/2010 |
| GB | 2 252 274 A | 8/1992 |

*Primary Examiner* — Karen Beck
(74) *Attorney, Agent, or Firm* — Brinks Gilson & Lione

(57) ABSTRACT

A plastic cover element (10) for a driver airbag module having a side wall (22) extending from a lower end (22a) to an upper end (22b), enclosing an interior space. The upper end (22b) is covered by an overlap (30) which extends in a radial direction across the side wall (22) and in an axial direction back toward the lower end (22a) of the side wall (22), forming a screen section (32) extending generally parallel to the side wall. The outside surface of the overlap has at least one groove (40) to receive the sewn edge of a casing. An axial section (44) of the groove (40) extends into the lower end area of the screen section (32) and in the area of this axial section (44) and at least one reinforcing rib extends parallel to it between the screen section (32) and the side wall (22).

11 Claims, 3 Drawing Sheets

(56) References Cited

U.S. PATENT DOCUMENTS

| | | | |
|---|---|---|---|
| 2002/0036397 A1* | 3/2002 | Fujita | B60Q 1/0082 280/731 |
| 2002/0056975 A1* | 5/2002 | Yoon | B60R 21/013 280/735 |
| 2008/0036184 A1* | 2/2008 | Takagi | B60R 21/21656 280/728.3 |
| 2011/0210534 A1* | 9/2011 | Sauer | B60R 21/2035 280/728.2 |
| 2014/0375031 A1* | 12/2014 | Bichler | B60R 21/203 280/728.3 |
| 2015/0091277 A1* | 4/2015 | Nonoyama | B60R 21/215 280/728.3 |
| 2015/0151704 A1* | 6/2015 | Ko | B60R 21/203 280/728.3 |

* cited by examiner

COVER ELEMENT COMPOSED OF PLASTIC FOR A DRIVER'S AIRBAG MODULE AND COVER CONSISTING OF SUCH A COVER ELEMENT AND A CASING ARRANGED ON THE LATTER

CROSS REFERENCE TO RELATED APPLICATIONS

This application claims priority to German Patent Application No. 10 2011 122 465.7, filed Dec. 24, 2011 and PCT/EP2012/004604, filed Nov. 5, 2012.

TECHNICAL AREA OF INVENTION

The invention relates to a plastic cover element for a motor vehicle driver airbag module

BACKGROUND

Driver airbag modules housed in the hub area of a vehicle steering wheel generally have a cover element of plastic. Usually this cover element has two functional sections, namely a side wall extending from a lower to an upper end in a radial direction (in relation to the steering column) which encloses an interior space to receive an airbag, and a covering which covers the upper end of the side wall. In many embodiments of such cover elements the covering overlaps the side wall in a radial direction. In the process a section of this overlap can extend in an axial direction toward the lower end of the side wall. As a rule, this section too is visible to the driver and can be found, for example, at the "6 o'clock" or "12 o'clock" position. In the following such a section is designated as a screen section. Such a driver airbag module is known, for example, from DE 197 30 340 A1.

As already mentioned, such a cover element is made of plastic and there is frequently the wish, especially in high-priced vehicles, to provide the part of the cover element which is visible and accessible to the driver with a casing, in particular of leather. Such a casing may consist of several blanks which are initially sewn together before the then completely sewn casing is positioned on the cover element and is glued to it. In order that the casing lie flat on the cover element, it may feature, at least one groove in which a connection area of the casing configured as a stitch comes to rest. A driver airbag module of this type is shown in DE 10 2009 030 151 B3.

In order to be able to meet the high visual and haptic demands on such a coverable cover element—especially when covered with leather—and also for functional reasons, the cover element advantageously consists of a soft plastic.

SUMMARY OF THE INVENTION

The object of this invention is to make available a simple and low-cost cover element, coverable with a casing with a screen section extending basically parallel to the side wall, wherein the visual and haptic demands simultaneously remain unaffected.

This object is achieved by a cover element with the features described herein.

If a cover element with a highly distinct screen section is desired, which extends almost to the lower end of the side wall of the covering in conjunction with a surface lining consisting of leather (hereinafter designated as a casing), then it is highly advantageous to provide in this screen section, preferably at its longest spot, a groove section to receive the connection area of the casing. Because the casing is in multiple pieces, it is basically easier to impart a shape to the casing that follows the cover element. Since for cost and functional reasons the cover element should preferably consist of soft plastic components, this conflicts with the visual and haptic requirements, especially with the screen sections extending almost to the lower end of the side wall.

Such a screen section initially constitutes a geometric instability which, without other measures, would put the visual and haptic requirements of the cover element in doubt. A reinforcing rib is therefore provided, which extends parallel to the groove section of the screen section (hereinafter designated the axial section) between the screen section and the side wall.

This reinforcing rib is preferably in a single piece (integral) with the cover element, so that this can be designed as a one-piece, injection molding part, with the result that production costs are virtually unchanged.

In a first preferred embodiment, the reinforcing rib aligns with the axial section of the groove; in an alternative embodiment the groove is provided between two reinforcing ribs running parallel to each other. Both variants result in the desired geometric stability.

The reinforcing rib need not extend across the entire length of the screen section, although that is preferred. If that should not be possible, the greatest possible overlap should be sought.

In order to avoid sink marks on the surface, the wall thickness of the cover element in a transition area between the side wall and the covering can preferably be increased at least in some sections relative to a lower area of the side wall and also preferably relative to a lower area of the screen section of the overlap.

A complete covering of a driver airbag module consisting of a cover element and a casing which is positioned on this cover element is also part of the present invention.

BRIEF DESCRIPTION OF THE DRAWINGS

Now the invention will be described in more detail using an embodiment with reference to the figures. Shown hereby are.

DESCRIPTION OF THE PREFERRED EMBODIMENTS

Figure 1:
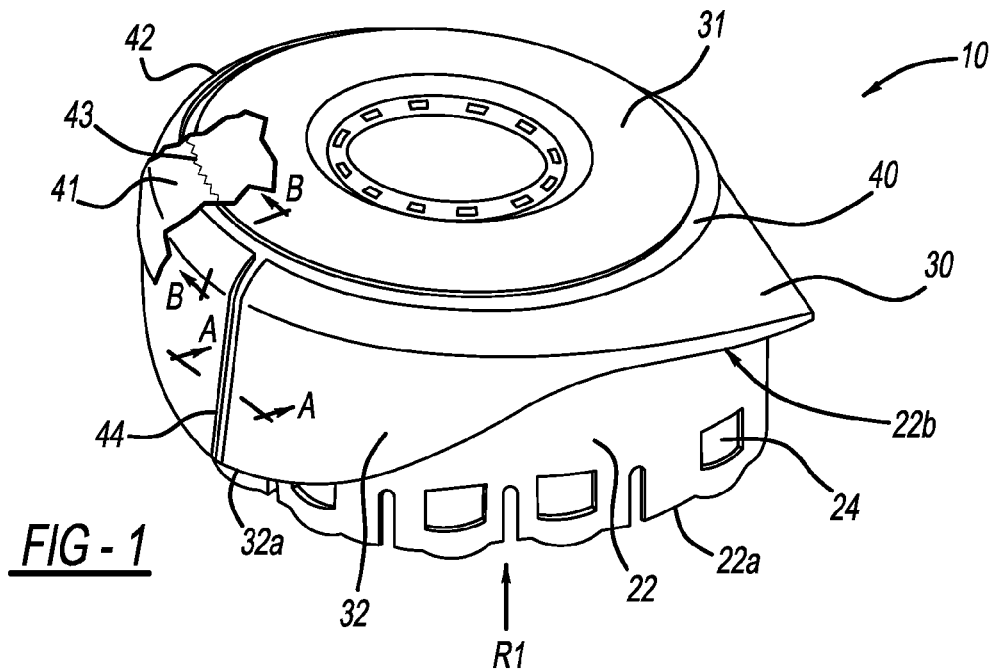
FIG. 1 is a view in perspective of an inventive cover element.

Shown in FIGS. 1, 2, 4, 5, and 6 is the same embodiment of the present invention in various views or cuts. Reference is therefore made to all of these in the following. As one can see particularly well in FIGS. 1 and 5, the cover element 10 features two sections, namely a circumferential side wall 22 which extends from a lower end 22a to an upper end 22b, and an overlap 30. Connection elements 24 are positioned in the area of the lower end 22a of the side wall 22, by which the cover element can be connected to a housing part of the airbag module. The side wall 22 is covered by the overlap 30, wherein the central section 31 of this overlap forms the hub area of the steering wheel. At the "6 o'clock position" the overlap 30 has a screen section 32, which extends from a central section on the radial outer side of the side wall 22 in a radial direction back toward the lower end 22a of the side wall.

In order to be able to arrange a casing consisting of several blanks on the overlap 30 in a positively locked manner, the latter has a groove 40 with two sections, namely the ring-shaped section 42 which surrounds the central section 31 and an axial section 44 which extends from the ring-shaped section 42 to the lower end 32a of the screen section 32. Accordingly, the casing 41 shown partially in FIG. 1 which is used consists of two blanks, namely a central blank and another blank surrounding the central blank (not shown). The connection areas of this casing configured as connection stitches 43 are received in the groove 40. Naturally, casings can also be used whose blanks are not sewn, but instead for example are welded or glued to one another. "Casing" 41 here is understood to be any element with a generally flat portion that covers the overlap wholly or in part in the direction of the passenger space.

Figure 6:
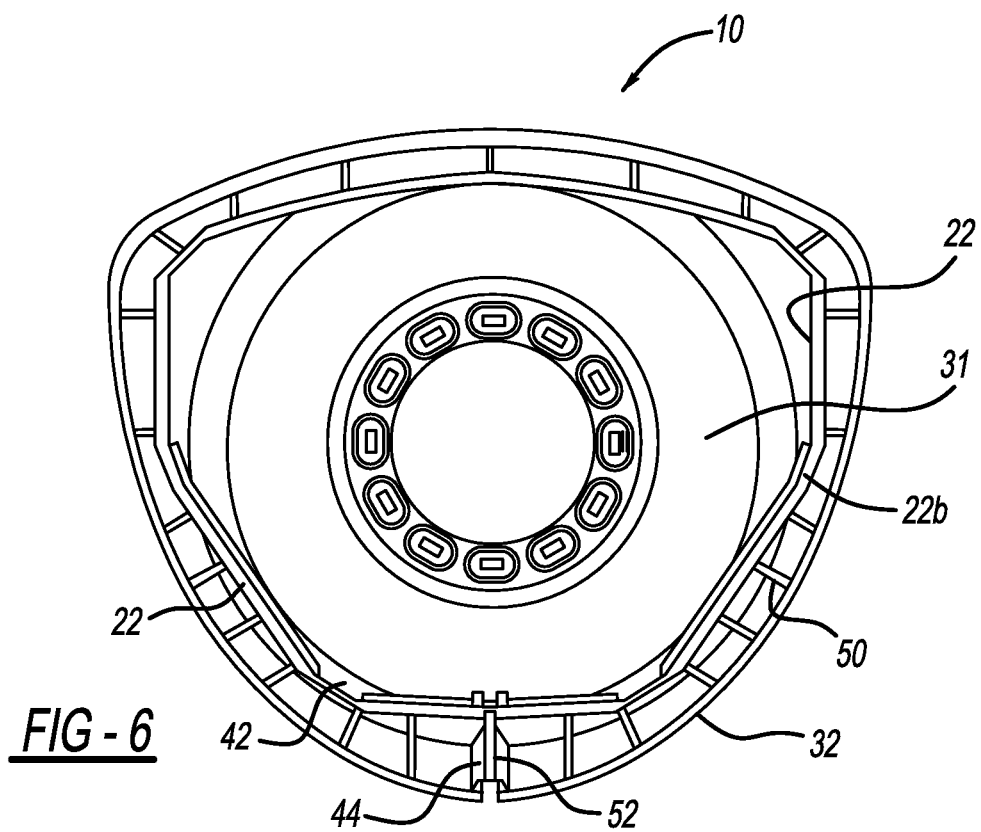
FIG. 6 shows the cover element from FIG. 1 in a view from below, namely from direction R1 in FIG. 1.

As can be seen in FIG. 6, the side wall 22 and overlap 30 are connected to each other by a plurality of ribs 50. As one can especially see in FIGS. 2, 5 and 6, one such rib, which here is designated as a reinforcing rib 52 extends between the base of the axial section 44 of the groove 40 and the side wall 22. This reinforcing rib 52 extends from the upper end of the screen section 32 along more than three-fourths of the length of the screen section. This reinforcing rib 52 imparts sufficient stability to the screen section 32 to ensure shape stability even after lamination of the casing 41. An overall increase of the wall thickness in the screen section 32 is not necessary here, but can make sense in individual cases.

Figure 7:
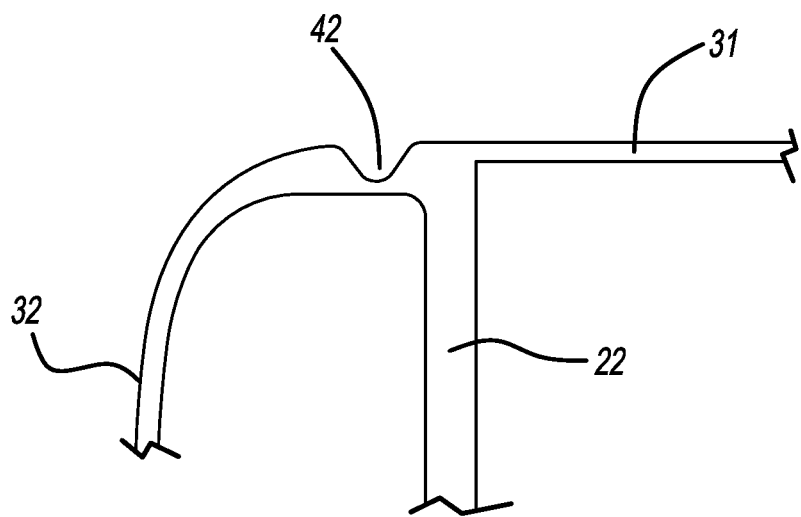
FIG. 7 shows a variant of that shown in FIG. 4.

In order to avoid sink marks on the surface, the wall thickness of the cover element 10 can be increased in a transition area between the side wall 22 and the screen section 32—preferably by section—with respect to a lower area of the side wall and furthermore, can also preferably be made greater relative to a lower area of the screen section of the overlap, as shown in FIG. 7.

Figure 2:
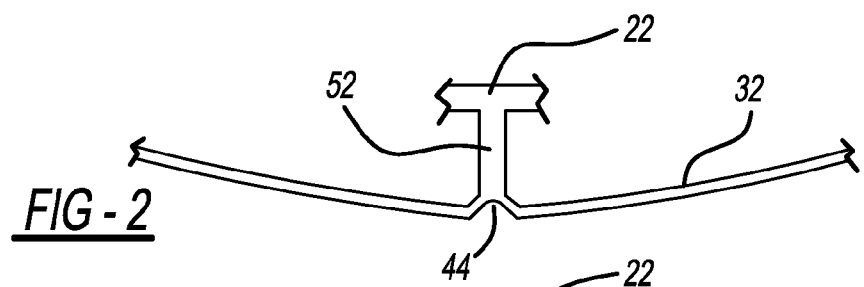
FIG. 2 is a cut along the cut plane in FIG. 1.
Figure 3:
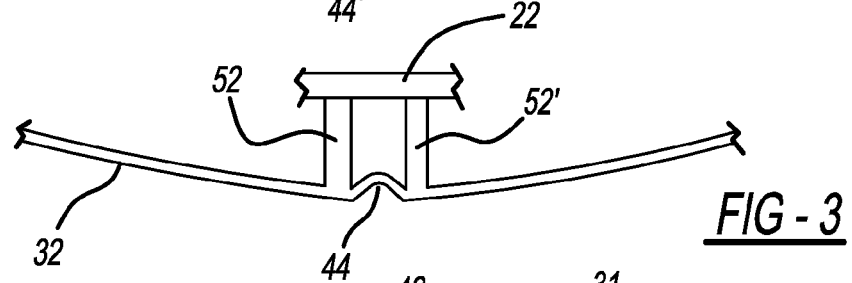
FIG. 3 is a variant of that shown in FIG. 2.
Figure 4:
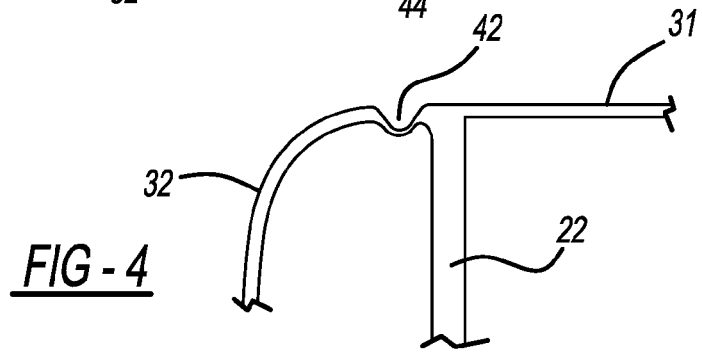
FIG. 4 is a cut along the cut plane B-B from FIG. 1.
Figure 5:
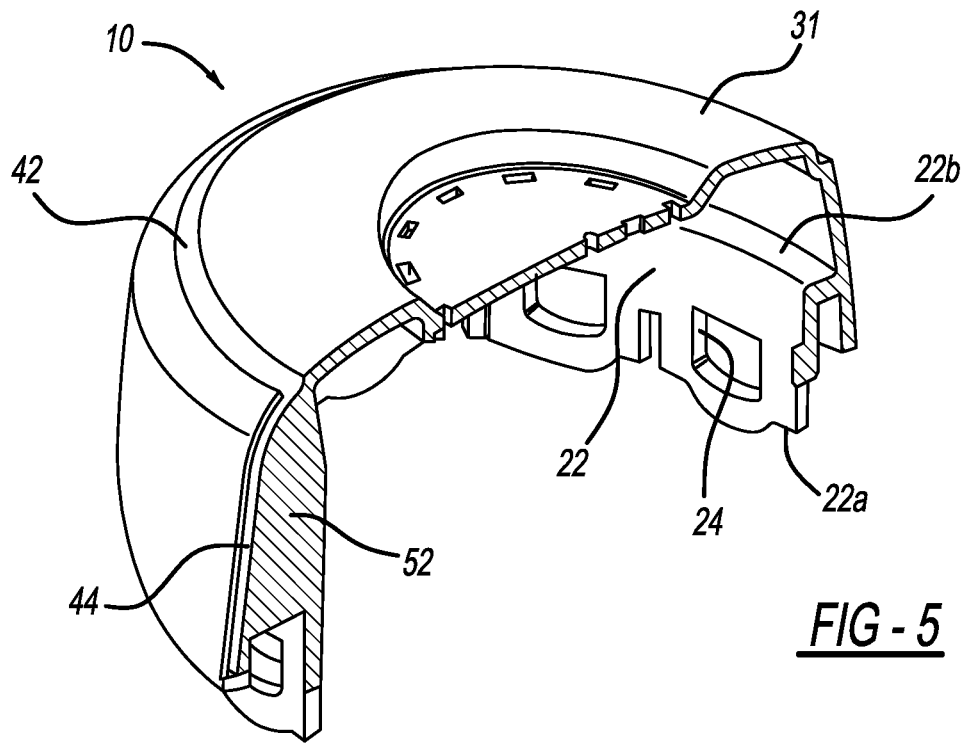
FIG. 5 is a cutaway depiction of the cover element in FIG. 1, wherein the cut plane runs vertically through the axial section of the groove.

FIG. 3 shows an alternative embodiment in a depiction corresponding to FIG. 2. This does not provide a reinforcing rib which extends from the base of the groove in the direction of the side wall 22, but two reinforcing ribs 52, 52' which in a sense delimit the reverse side of the groove 40 and extend parallel to each other to the side wall 22. The effect is the same as depicted above, namely the area of the axial section 44 of the groove 40 is geometrically reinforced, so that even after lamination of the casing 41, shape stability is assured. Therefore other reinforcement measures, in particular the injection of another plastic structure, is not necessary.

The geometry of the groove 40 ensures that a casing consisting of only a few blanks (two in the embodiment shown) can be used, while the arrangement of the reinforcement rib 52 (and 52') in combination with the groove geometry ensures that the cover element 10 can be designed as a one-piece, plastic, injection-molded part. This results overall in a very rational production process, without visual/haptic quality and/or geometric stability disadvantages. 52, 52'

While the above description constitutes the preferred embodiment of the present invention, it will be appreciated that the invention is susceptible to modification, variation and change without departing from the proper scope and fair meaning of the accompanying claims.

The invention claimed is:

1. A plastic cover element for a driver airbag module having an airbag comprising;
   a side wall extending circumferentially from a lower end to an upper end and enclosing an interior space adapted to receive the airbag,
   an overlap covering the upper end of the side wall, which extends in a radial direction across at least a portion of the side wall and in an axial direction back toward the lower end of the side wall, thereby forming a screen section extending generally parallel to the side wall,
   an outward facing surface of the overlap forming at least one groove having an axial section of the groove extending to a lower end of the screen section, and the cover forming at least one reinforcing rib on an inward facing surface of the overlap extending in the area of the axial section of the groove and parallel to the axial section between the screen section and the side wall.

2. The cover element according to claim 1 that the reinforcing rib is a first reinforcing rib and further comprising a second reinforcing rib aligned with the axial section of the groove.

3. The cover element according to claim 2 further comprising in that the first and the second reinforcing ribs running generally parallel to each other, wherein the axial section of the groove is located between radial projections of the first and the second reinforcing ribs.

4. The cover element according to claim 3 further comprising in that the separation between the first and the second reinforcing ribs corresponds basically to the width of the axial section of the groove.

5. The cover element according to claim 1 further comprising in that the reinforcing rib extends from a transition area between the side wall and the overlap at least into a lower one third of the screen section.

6. The cover element according to claim 1 further comprising that the cover element is constructed as single injection-molded piece.

7. The cover element according to claim 1 further comprising in that a wall thickness is increased in a transition area between the side wall and the overlap at least in sections with respect to the lower area of the screen section.

8. The cover element according to claim 1 adapted for use with a casing arranged on the overlap thereby forming a covering for the airbag module, the casing composed of several blanks, wherein connection areas of the blanks lie in the at least one groove.

9. The cover element for an airbag module according to claim 8 wherein the connection areas include stitching.

10. The cover element according to claim 8 further comprising the at least one groove further including a ring-shaped portion and the connection areas overlay the ring-shaped portion.

11. The cover element according to claim 1 forming a cover assembly with a casing applied to an outer surface of the cover element.

* * * * *